United States Patent [19]

DeHaitre

[11] Patent Number: 5,078,562
[45] Date of Patent: Jan. 7, 1992

[54] SELF-LOCKING THREADED FASTENING ARRANGEMENT

[75] Inventor: Lon DeHaitre, Arlington Heights, Ill.

[73] Assignee: Abbott-Interfast Corporation, Wheeling, Ill.

[21] Appl. No.: 699,137

[22] Filed: May 13, 1991

[51] Int. Cl.$^5$ .............................................. F16B 39/34
[52] U.S. Cl. ...................... 411/302; 411/324; 411/366; 411/427; 411/947
[58] Field of Search ............... 411/947, 907, 132, 292, 411/301, 302, 303, 312, 322, 324, 340, 427, 432, 366

[56] References Cited

U.S. PATENT DOCUMENTS

| | | | |
|---|---|---|---|
| 362,909 | 5/1887 | Tucker | 411/303 |
| 571,067 | 11/1896 | Ebert | 411/312 |
| 2,394,104 | 2/1946 | Rankin | 411/301 |
| 2,812,527 | 11/1957 | Pavlinetz | 411/947 X |
| 2,872,961 | 2/1959 | Mills et al. | 411/303 |
| 3,302,150 | 1/1967 | Lyman, Jr. | 411/947 X |
| 4,088,327 | 5/1978 | Bachle | 411/947 X |

FOREIGN PATENT DOCUMENTS 1027939 4/1958 Fed. Rep. of Germany ...... 411/303

*Primary Examiner*—Rodney M. Lindsey
*Attorney, Agent, or Firm*—Welsh & Katz, Ltd.

[57] ABSTRACT

A self-locking fastening arrangement includes a member having a substantially planar surface intersected by a blind threaded bore adapted to receive a complimentary threaded bolt or shank. The tapped bore terminates a predetermined distance from the planar surface in a closed end. A resilient substantially cylindrical insert is disposed within the bore adjacent the closed end and is configured to establish a space between the insert and the closed end of the tapped bore. The insert is compressed upon insertion of a threaded shank into the bore a predetermined distance so as to effect self-locking axial loading between the interengaging male and female threads. An annular lip is formed adjacent at least one end of the insert for engaging the tapped bore to prevent inadvertent release of the insert from the bore. In one embodiment, the fastening member takes the form of a self-locking acorn or cap nut having a blind taped bore which receives the resilient insert.

19 Claims, 1 Drawing Sheet

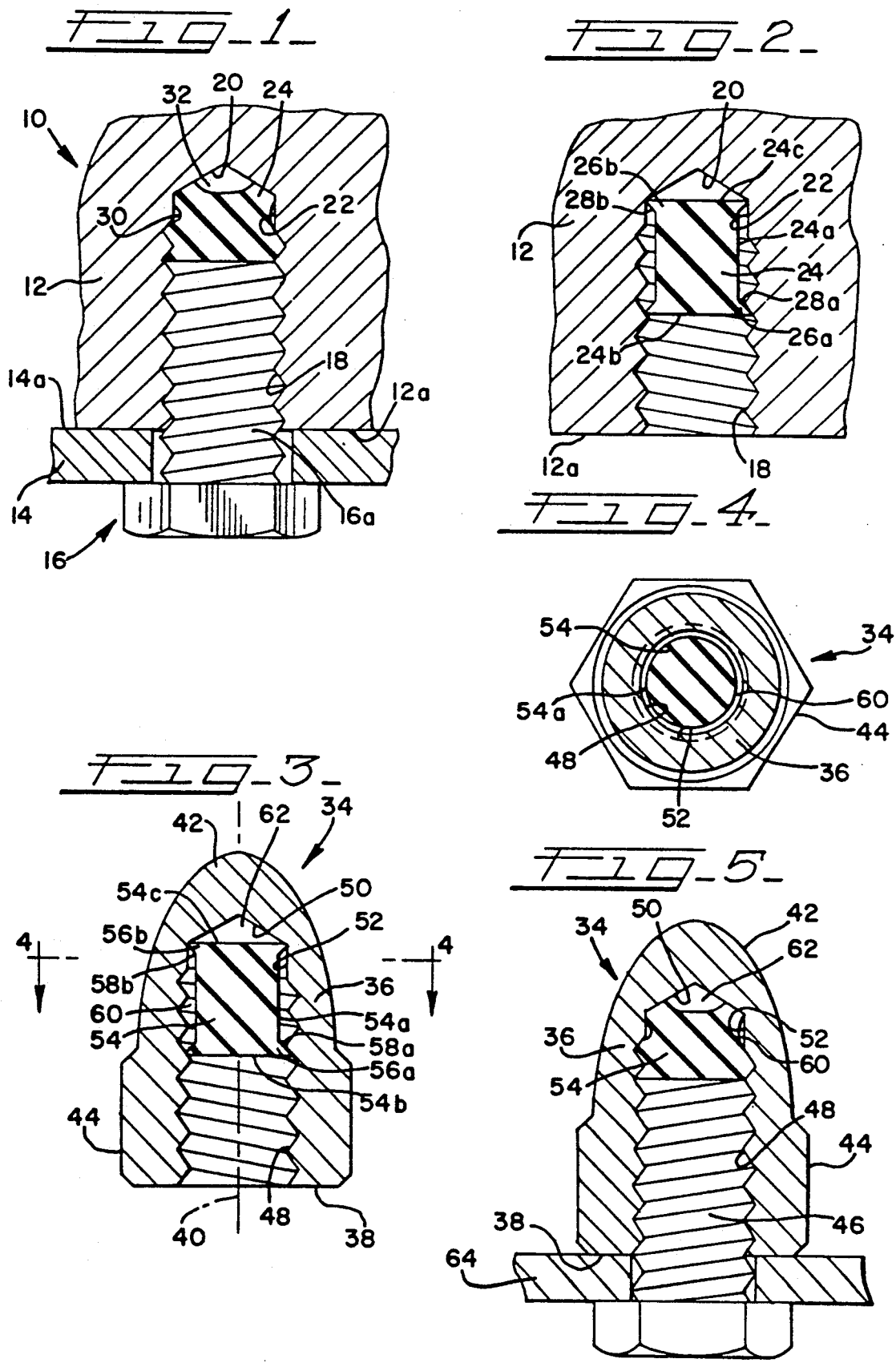

SELF-LOCKING THREADED FASTENING ARRANGEMENT

BACKGROUND OF THE INVENTION

The present invention relates generally to fastening arrangements for securing a member to a threaded bolt or shank in self-locking relation, and more particularly to a novel self-locking fastening arrangement wherein a threaded bore having a blind end is formed in a member and receives a resilient insert configured to effect self-locking between the interengaging threads of the bore and a threaded bolt or shank when inserted a predetermined distance into the bore.

It is a conventional practice in the assembly of various machine parts and the like, and particularly in fastening various components in assembled relation, to form a blind tapped bore in a member for receiving and connection to a threaded bolt or shank. To prevent inadvertent release of the threaded bolt or shank from the threaded bore, it is common practice to employ a lock washer between opposed surfaces of the connected parts, such as between the head of a bolt and the surface periphery of the threaded bore, so as to put the interengaging threads in an axially loaded condition. When employing nuts and bolts to connect two or more parts together, the lock washer is generally interposed between the nut and an opposed surface so as to prevent inadvertent loosening or release of the nut from the associated bolt. An alternative to the use of external lock washers is to provide means internally of a nut or within a threaded blind bore to effect self-locking with a threaded shank or bolt. This approach eliminates the use of externally visible lock washers and is thus less obtrusive where cosmetic appearance is a factor. Examples of the latter type of locknuts are disclosed in U.S. Pat. Nos. 571,067, 2,410,444, 3,445,559 and 4,781,505.

U.S. Pat. No. 3,445,559 discloses a method of making a self-locking nut wherein a high-dielectric body carries a corrosion-resistent metallic sheath insert which defines the internal threads of the nut. A shroud of dilatant material is formed within the molded body as an extension of the internally threaded sheath, and serves to grip a threaded stud and resist rotative movement after assembly of the nut onto the stud. One embodiment of the nut disclosed in Pat. No. 3,445,559 forms the shroud as a full-covering cap engaged by the end of the threaded stud so that the shroud is compressed by the end of the stud and I4 forced tightly against the stud to cause a gripping action resistent to removal or loosening of the nut by ordinary vibration and the like. A significant drawback in the latter described arrangement is that the dilatant shroud completely fills the blind end of the nut bore so that tightening the nut onto a threaded stud may compress the dilatant shroud to an extent that hydraulic pressures are created which can cause male thread breakage on the stud, fracture of the associated nut body, or compression of the shroud beyond its elastic limit so that it takes a permanent set. The latter results in loss of the locking characteristics of the nut after initial usage and thereby greatly limits re-use of the nut.

The present invention addresses the aforedescribed problems in known prior self-locking nuts and the like.

SUMMARY OF THE INVENTION

One of the primary objects of the present invention is to provide a novel self-locking fastening arrangement wherein a threaded bore having a blind end is formed within a member and receives a resilient insert operative to effect self-locking with a threaded bolt or shank inserted into the bore a predetermined distance, and which enables subsequent use after disassembly without loss of the self-locking characteristics.

A more particular object of the present invention is to provide a novel self-locking fastening arrangement wherein a threaded bore having a blind end is formed in a member to which a threaded bolt or shank is to be connected, and wherein a resilient insert is positioned at the blind end of the threaded bore and is configured to establish a space about its periphery and between the insert and the blind end surface so that insertion of a threaded bolt or shank a predetermined distance into the bore effects compression of the resilient insert sufficiently to effect desired self-locking axial loading with the threaded shank without causing hydraulic reaction pressures sufficient to damage the assembly or inhibit removal and subsequent use of the insert.

A feature of the self-locking fastening arrangement in accordance with the present invention lies in providing an external projection adjacent at least one end of the resilient insert for engagement with the internal thread of the bore to prevent inadvertent release or displacement of the insert from the threaded bore after insertion. Preferably, an annular lip is provided at each end of the insert to eliminate the need for a particular axial orientation of the insert during assembly into the tapped bore, either of the annular lips being adapted for engagement with the threaded bore to maintain the insert in captive relation and prevent displacement during handling of the parts being assembled.

Further objects, features and advantages of the invention will become apparent from the following detailed description of the invention when taken in conjunction with the accompanying drawing wherein like reference numerals designate like elements throughout the several views.

BRIEF DESCRIPTION OF THE DRAWING

FIG. 1 is a fragmentary vertical sectional view of a member have a threaded blind bore in which is disposed a resilient insert to effect self-locking with a threaded bolt or shank in accordance with the present invention;

FIG. 2 is a fragmentary vertical sectional view of the member of FIG. 1 but with the threaded bolt or shaft removed from the threaded bore;

FIG. 3 is a longitudinal sectional view of a self-locking acorn or cap nut having a threaded bore and resilient insert in accordance with the present invention;

FIG. 4 is a transverse sectional view taken substantially along line 4—4 of FIG. 3; and FIG. 5 is a longitudinal sectional view illustrating the self- nut of FIG. 4 in assembled relation on a threaded shank or bolt.

DETAILED DESCRIPTION

Referring now to the drawing, a self-locking fastening arrangement in accordance with the present invention is indicated generally at 10 in FIG. 1. The self-locking fastening arrangement 10 includes a first suitable strength metallic member 12 to which is secured a second member 14 by a threaded bolt 16. Alternatively, the threaded bolt 16 may comprise a threaded shank having an end fixed to member 14, as by welding or the like, and extending a predetermined distance from a generally planar surface 14a which abuts a planar surface 12a on member 12. Alternatively, one or both of the members 12 and 14 may be made of a high strength synthetic resin plastic or the like.

The planar surface 12a of member 12 is intersected by a threaded bore 18 formed so that the axis of the threaded bore is perpendicular to the planar surface 12a. The threaded bore 18 terminates internally of member 12 in a blind end surface 20 such as formed by the end of a conventional metal cutting drill bit which forms a cylindrical lead bore having an annular surface 22 of a diameter approximately equal to the minor diameter of a conventional thread cutting tap used to form the internal threaded bore 18.

The threaded bore 18 and associated blind end 20 extend within member 12 a predetermined distance from the planar surface 12a to receive a resilient substantially cylindrical insert 24 adjacent the blind end of the tapped bore. The resilient insert 37 24 preferably has an outer cylindrical surface 24a and substantially parallel planar end surfaces 24b and 24c which lie transverse to the longitudinal axis of the insert when in a non-compressed or relaxed condition. An outwardly extending projection in the form of an annular lip is formed adjacent at least one end of the resilient insert 24, and preferably adjacent each end thereof such as indicated at 26a and 26b in FIG. 1. Each of the annular lips 26a and 26b has an outer diameter slightly greater than the minor diameter of the internal threaded bore 18. In this manner, when the insert 24 is inserted within the threaded bore 10 and moved axially to the blind end 20, the annular lip 26a or 26b closest to the planar surface 12a engages the threaded bore to prevent inadvertent displacement or dislodgement of the resilient insert from the threaded bore, thereby maintaining the insert in captive relation at the blind end of the bore. Preferably, each of the annular lips 26a,b has a beveled annular surface, such as indicated at 28a and 28b, respectively, formed thereon to facilitate flexing of the annular lips and insertion into the tapped bore.

By forming the resilient insert 24 generally symmetrical relative to a transverse plane intersecting the longitudinal axis of the insert at its mid-length, manufacturing efficiency is increased by enabling insertion of an insert into a threaded bore, such as bore 18, and retention by one of the annular lips 26a,b without requiring a particular end placement or orientation of the insert during assembly. The insert 24 is made of a high impact elastomer such as a suitable rubber or plastic having high impact resiliency characteristics. For example, the insert 24 may be made of a high impact plastic such as ST 801 nylon available from The DuPont Company. The particular material selected for the insert 24 may be characterized as having relatively high memory so that the insert will consistently revert to a relaxed non-compressed and non-deformed condition after compression by entry of a threaded shank, such as 16a, a predetermined distance into the threaded bore 18.

In accordance with an important feature of the invention, the resilient insert 24 is configured to establish a generally annular space or void between the outer cylindrical surface 24a of the insert and the opposed annular surface 22 of the lead hole 20 and the annular threaded bore 18, such as indicated at 30 in FIG. 1. The insert 24 is also configured to establish a space or void, indicated at 32 in FIG. 1, between the innermost end surface of the insert, such as 24c, and the closed or blind end 20 of the threaded bore when the insert is inserted into the tapped bore such that the periphery of the end 24c, as defined by the annular lip 26b, engages a corresponding diameter of the blind end surface 20 of the threaded bore. The total space or void created between the outer cylindrical surface 24a of the non-compressed resilient insert 24 and the opposed surfaces of the bore 20 and its blind end is of predetermined volume so that threaded assembly of a threaded bolt or shank 16 a predetermined distance into the threaded bore 18 compresses the resilient insert sufficiently to axially load the interengaging thread surfaces and obtain frictional self-locking without inhibiting return of the insert to substantially its original non-compressed condition upon release or withdrawal of the bolt or shank from the bore 18. This facilitates removal of the threaded shank or bolt 16 from the threaded bore 18 and reassembly of the same or a similar threaded shank or bolt back into bore 18 the same predetermined distance without loss of the self-locking provided by insert 24. Stated alternatively, the geometrical relationship between the resilient insert 24 and the tapped bore 18 is selected such that threaded engagement with a predetermined length of a threaded shank or bolt effects sufficient axial loading between the male and female threads to obtain self-locking without causing the resilient insert to take a permanent set. To this end, the material from which the resilient insert 24 is made, and the geometrical shape and size of the insert, are selected for a specific minimum and maximum bolt or shank length insertion which results in the desired self-locking without compressing the insert to completely fill the void area about the insert. This results in non-destructive reusable self-locking without need for a lock washer or the like between the head of the bolt 16 and the adjacent member 14 through which the threaded shank or the bolt extends.

FIGS. 4-6 illustrate another embodiment of the present invention in the form of a self-locking acorn or cap nut indicated generally at 34. The self-locking nut 34 includes a body 36 which is preferably made of a suitable strength metallic material, such as an alloy steel or stainless steel having desired strength and corrosion resistent properties. Alternatively, the nut body 36 may, in some applications, be made of a high strength synthetic resin or the like.

The nut body 36 has a first end 38 defining a planar bearing surface disposed substantially transverse to the longitudinal axis of the nut body as indicated by the centerline 40 in FIG. 3. The nut body 36 has a second generally crownshaped or acorn-shaped end 42 opposite the first end 14. A wrench surface in the form of a polygonal shaped surface 44 is formed circumferentially about the nut body 36 generally adjacent the planar end 38 to facilitate gripping of the nut by a suitable wrench or socket during torquing of the nut onto a threaded shank or bolt such as indicated at 46 in FIG. 5.

The nut body 36 has a tapped bore 48 formed therein which intersects the planar end 38 of the nut body and extends axially toward the closed crown or acorn-shaped end 42. The tapped bore 48 terminates internally of the nut body in a blind end surface 50 such as formed by the end of a conventional metal cutting drill bit which forms a cylindrical lead bore 52 approximately equal to the minor diameter of the subsequently tapped bore 48 formed by a conventional thread cutting tap.

The tapped bore 48 and associated blind end 50 extend axially within the nut body a predetermined distance from the planar end 38 to receive a resilient substantially cylindrical insert 54 adjacent the blind end of the tapped bore. The resilient insert 54 is substantially identical to the 33 aforedescribed insert 24 and has an outer cylindrical surface 54a and substantially parallel planar end surfaces 54b and 54c which lie transverse to the longitudinal axis of the insert when in a non-compressed or relaxed condition. An outwardly extending projection in the form of an annular lip is formed adjacent at least one end of the resilient insert 54, and preferably adjacent each end thereof such as indicated at 56a and 56b in FIG. 5. As with the insert 24, each of the annular lips 56a and 56b has an outer diameter slightly greater than the minor diameter of the tapped bore 48 so that when the insert 54 is inserted within the tapped bore 48 and moved axially to the blind end 50, the annular lip 56a or 56b closest to the end 38 engages the threaded bore to prevent inadvertent displacement or dislodgement of the resilient insert from the tapped bore, thereby maintaining the insert in captive relation at the blind end of the tapped bore. Preferably, each of the annular lips 56a,b has a beveled annular surface, such as indicated at 58a and 58b, respectively, formed thereon to facilitate flexing of the annular lips and insertion into the tapped bore.

The resilient insert 54 is generally symmetrical relative to a transverse plane intersecting the longitudinal axis of the insert at its mid-length, thereby enabling insertion of an insert into the tapped bore of an associated nut and retention by an annular lip 56a,b without requiring a particular end placement or orientation of the insert during assembly. The insert 54 is similarly made of a high impact elastomer having high impact resiliency characteristics, such as ST 801 nylon, having relatively high memory so that the insert will consistently revert to a relaxed non-compressed non-deformed condition after compression by entry of a threaded shank, such as 46, a predetermined distance into the threaded bore 48.

As with the insert 24, the resilient insert 54 is configured to establish a generally annular space or void 60 (FIG. 3) between the outer peripheral surface 54a of the insert and the opposed surfaces of the lead hole 52 and threaded bore 48. A space or void 62 is also established between the innermost end surface of the insert, such as 54c, and the blind end 50 of the tapped bore when the insert is fully inserted into the tapped bore. The space or void created between the outer surface of the non-compressed resilient insert 54 and the threaded bore 48 and blind end 50 is of predetermined volume so that threaded assembly of a nut 34 onto a threaded shank or bolt 46 a predetermined distance compresses the resilient insert sufficiently to obtain self-locking without inhibiting return of the insert to substantially its original non-compressed condition upon release of the nut from the threaded shank. This facilitates self-locking re-use of the nut 34 after release from a threaded shank and reassembly onto the same or a similar threaded shank or bolt the same predetermined distance. Stated alternatively, the geometrical relationship between the resilient insert 54 and the tapped bore 48 is selected such that threaded engagement of the nut 34 onto a threaded shank 46 within a predetermined range of shank insertion effects sufficient axial loading between the male and female threads of the nut and threaded shank to obtain self-locking without causing the resilient insert to completely fill the void area about the insert or take a permanent set. This results in a non-destructive reusable self-locking locknut having the desired cosmetic appearance of an acorn or cap nut or the like without need for a lock washer between the planar end 38 of the nut and an opposed member, such as the plate or work piece indicated at 64 in FIG. 6, through which the threaded shank of the bolt 46 may extend.

Thus, in accordance with the present invention, a self-locking fastening arrangement is provided wherein assembly of a threaded shank or bolt a predetermined distance into a threaded bore having a resilient insert of a predetermined configuration relative to the bore is operative to pre-load the insert and create an internal "double-nut" locking effect between the male and female threads. In the acorn nut embodiment of the invention, sufficient compression of the resilient insert is effected to obtain self-locking between the threaded shank or bolt and the female threaded bore in the nut without creating hydraulic pressures within the nut which could cause failure of the male or female threads, or fracture the dome or crown-shaped closed end of the acorn nut. Thus, the self-locking acorn or cap nut enables repeated use without significant loss of its self-locking characteristics when assembled a predetermined distance onto a threaded shank or bolt.

While preferred embodiments of the present invention have been illustrated and described, it will be understood to those skilled in the art that changes and modifications may be made therein without departing from the invention in its broader aspects. Various features of the invention are defined in the following claims.

What is claimed is:

1. A self-locking fastening arrangement comprising a member having an external surface, a threaded bore formed in said member so as to intersect said external surface, said bore terminating internally of said member in a closed end spaced a predetermined distance from said external surface, and a resilient substantially cylindrical insert disposed within said bore adjacent said closed end thereof, said insert being configured to establish a generally annular space between said insert and the opposed bore and establish a space between an inner end of said insert and said closed end of said bore so that insertion of a complimentary threaded shank into said bore a predetermined distance causes compression of said insert to effect axial loading of the interengaging thread surfaces, the volume of space between said bore and said insert when in a non-compressed condition being sufficient to enable said predetermined insertion of said shank without inhibiting return of said insert to substantially its original non-compressed is condition upon removal of said shank from said threaded bore.

2. A self-locking fastening arrangement as defined in claim wherein said insert has an external projection adjacent at least one end thereof for engaging the threaded bore to prevent inadvertent displacement of the insert from said bore.

3. A self-locking fastening arrangement as defined in claim 2 wherein said external projection is defined by an annular lip formed adjacent said at least one end of said insert, said lip having an outer diameter greater than the minor diameter of said threaded bore.

4. A self-locking fastening arrangement as defined in claim 3 wherein said insert has a generally cylindrical configuration and has one of said annular lips formed adjacent each end thereof.

5. A self-locking fastening arrangement as defined in claim 1 wherein said insert is made of a high impact elastomer.

6. A self-locking fastening arrangement as defined in claim 5 wherein said elastomer comprises a high impact plastic having a memory sufficient to cause said insert to revert to a non-compressed condition when the shank is removed from said threaded bore.

7. A self-locking fastening arrangement as defined in claim 1 wherein said insert is characterized as having sufficient memory to revert to a non-deformed condition after removal of the shank from said threaded bore.

8. A self-locking fastening arrangement as defined in claim 1 wherein said generally concave closed end of said threaded bore is defined by a conical surface.

9. A self-locking fastening arrangement as defined in claim 1 wherein said member is made of a metallic material.

10. A self-locking nut comprising a nut body having a first end defining a planar bearing surface disposed substantially transverse to a longitudinal axis of said body, a second generally crown-shaped end opposite said first end, and a wrench surface formed on said body generally adjacent said first end, said body having a threaded bore formed in said body so as to intersect said first end and extend axially toward said second end, said bore terminating internally of said body in a closed end spaced a predetermined distance from said planar bearing surface, and a resilient substantially cylindrical insert disposed within said threaded bore adjacent said closed end thereof, said insert being configured to establish a generally annular space between said insert and the opposed bore and establish a space between an inner end of said insert and said closed end of said bore so that insertion of a complimentary threaded shank into said bore a predetermined distance causes compression of said insert to effect axial loading of the interengaging thread surfaces, the volume of space between said bore and said insert when in a non-compressed condition being sufficient to enable said predetermined insertion of said shank without inhibiting return of said insert to substantially its original non-compressed condition upon removal of said shank from said threaded bore.

11. A self-locking nut as defined in claim 10 wherein said insert has an external projection adjacent at least one end thereof for engaging the tapped bore to prevent inadvertent displacement of the insert from said bore.

12. A self-locking nut as defined in claim 11 wherein said external projection is defined by an annular lip formed adjacent said end of said insert, said lip having an outer diameter greater than the minor diameter of said threaded bore.

13. A self-locking nut as defined in claim 12 wherein said insert has a generally cylindrical Configuration and has one of said annular lips formed adjacent each end thereof.

14. A self-locking nut as defined in claim 10 wherein said insert is made of a high impact elastomer.

15. A self-locking nut as defined in claim 14 wherein said elastomer comprises a high impact plastic having a memory sufficient to cause said insert to revert to a non-compressed condition when the nut is removed from said complimentary threaded shank.

16. A self-locking nut as defined in claim 10 wherein said insert is characterized as having sufficient memory to revert to a non-deformed condition after release of the nut from said threaded shank.

17. A self-locking nut as defined in claim 10 wherein said closed end of said tapped bore is defined by a conical surface.

18. A self-locking nut as defined in claim 10 wherein said nut body is made of a metallic material.

19. A self-locking nut comprising a metallic body having a first end defining a planar bearing surface disposed substantially transverse to a longitudinal axis of said body, a second generally crown-shaped end opposite said first end, and a wrench surface formed on said body generally adjacent said first end, said body having a tapped bore formed in said body so as to intersect said first end and extend axially toward said second end, said bore terminating internally of said body in a closed end spaced a predetermined distance from said planar bearing surface, and a resilient substantially cylindrical insert disposed within said bore adjacent said closed end thereof, said insert being configured to establish a generally annular space between said insert and the opposed tapped bore and having an annular lip formed adjacent at least one end thereof for engaging the tapped bore to prevent inadvertent release of said insert from said bore, said insert being compressed upon insertion of a complimentary threaded shank into said bore a predetermined distance so as to effect self-locking axial loading between the interengaging threads of said nut and shank.

* * * * *

UNITED STATES PATENT AND TRADEMARK OFFICE
CERTIFICATE OF CORRECTION

PATENT NO.   : 5,078,562
DATED        : January 7, 1992
INVENTOR(S)  : DeHaitre

It is certified that error appears in the above-indentified patent and that said Letters Patent is hereby corrected as shown below:

Column 3, line 18, delete "37".
Column 6, line 48, (Claim 1) delete "is".
Column 6, line 51, (Claim 2) insert --1-- after "claim".
Column 8, line 4, (Claim 13) "Configuration" should read --configuration--.

Signed and Sealed this

Nineteenth Day of September, 1995

Attest:

BRUCE LEHMAN

Attesting Officer

Commissioner of Patents and Trademarks